(12) United States Patent
Yu et al.

(10) Patent No.: US 11,513,030 B2
(45) Date of Patent: Nov. 29, 2022

(54) TIDAL SIMULATION TEST DEVICE AND METHOD OF USE THEREOF

(71) Applicant: Ludong University, Yantai (CN)

(72) Inventors: Junbao Yu, Yantai (CN); Miao Yu, Yantai (CN); Debin Sun, Yantai (CN); Kai Ning, Yantai (CN); Hongfang Dong, Yantai (CN); Xuehong Wang, Yantai (CN); Yunzhao Li, Yantai (CN); Di Zhou, Yantai (CN); Jisong Yang, Yantai (CN); Chao Zhan, Yantai (CN); Zhikang Wang, Yantai (CN); Zhenbo Lv, Yantai (CN); Jianbai Zhang, Yantai (CN); Yang Yu, Yantai (CN)

(73) Assignee: Ludong University, Yantai (CN)

( * ) Notice: Subject to any disclaimer, the term of this patent is extended or adjusted under 35 U.S.C. 154(b) by 122 days.

(21) Appl. No.: 17/224,400

(22) Filed: Apr. 7, 2021

(65) Prior Publication Data
US 2022/0018730 A1 Jan. 20, 2022

(30) Foreign Application Priority Data
Jul. 16, 2020 (CN) .......................... 202010686439.X

(51) Int. Cl.
*G01M 10/00* (2006.01)
(52) U.S. Cl.
CPC .................................. *G01M 10/00* (2013.01)

(58) Field of Classification Search
CPC ..................................................... G01M 10/00
See application file for complete search history.

(56) References Cited

U.S. PATENT DOCUMENTS

2020/0024834 A1* 1/2020 Park ......................... E03B 3/08

FOREIGN PATENT DOCUMENTS

| CN | 208956512 U | * | 6/2019 |
| CN | 210574461 U | * | 5/2020 |

* cited by examiner

*Primary Examiner* — Paul M. West
(74) *Attorney, Agent, or Firm* — Loginov & Associates, PLLC; William A. Loginov

(57) ABSTRACT

The present disclosure provides a tidal simulation test device and a method of use thereof. The tidal simulation test device includes a water supply pool, a water level adjustment pool, a subtidal zone simulation pool, an intertidal zone simulation pool, a supratidal zone simulation pool and a two-way water flow adjustment control box. The two-way water flow adjustment control box is provided therein with an electromagnetic flow control meter, a forward frequency conversion self-priming pump, a reverse frequency conversion self-priming pump and an intelligent time-controlled three-way controller. In the method, the start and stop of the forward frequency conversion self-priming pump and the reverse frequency conversion self-priming pump are controlled through an intelligent switch, and a water flow is adjusted through the electromagnetic flow control meter, thereby realizing periodic changes in a water level to simulate different types of tides and coastal wetlands.

8 Claims, 1 Drawing Sheet

TIDAL SIMULATION TEST DEVICE AND METHOD OF USE THEREOF

TECHNICAL FIELD

The present disclosure relates to the technical field of ecological environment engineering, in particular to a tidal simulation test device and a method of use thereof. The present disclosure aims to study changes in the physical and chemical indexes of soil, the evolution of vegetation types, the dynamics of microbial populations, the migration and transformation of nutrient elements and heavy metal elements in tidal wetlands in a supratidal zone, an intertidal zone and a subtidal zone under the influence of different types of tides.

BACKGROUND

Tide is one of the major impetuses of land-sea interaction and an important factor for the formation and evolution of coastal wetlands. In the coastal wetland, the physical and chemical properties of the soil, the process of element migration and transformation, the evolution of vegetation, the structures of microbial populations, and the structural stability and functions of the coastal wetland are all driven by the tide. At present, there is no outdoor simulation device that can precisely control different types of tidal processes and target the action processes of different types of tides on different types of coastal wetlands. It is very necessary to develop an accurate tidal simulation test device, so as to accurately simulate the mechanism of action of different types of tides on the ecological processes of different types of coastal wetlands, improve the credibility and work efficiency of tidal simulation research and effectively eliminate the interference of field environmental factors and the danger of field operations. The existing method for studying the impact of the tidal action on the ecological process of the wetland is to set up a long-term monitoring fixed sample plot in the field, and measure relevant indicators in the laboratory after regular sampling. However, due to the complex and harsh conditions of the coastal wetlands in some areas, it is hard to implement this method because of certain dangers. In addition, this method cannot meet the monitoring frequency requirements of the research, and it is impossible to achieve simultaneous observation of different types of wetlands.

SUMMARY

In order to overcome the above-mentioned shortcomings of the prior art, an objective of the present disclosure is to provide a tidal simulation test device for different types of coastal wetlands.

Another objective of the present disclosure is to provide a method for using the tidal simulation test device.

The present disclosure mainly solves the actual problem that the existing field monitoring method cannot accurately control the action process of different types of tides on the structure and function of the coastal wetland.

The present disclosure provides a technical solution as follows: a tidal simulation test device, including a water supply pool, a water level adjustment pool, a subtidal zone simulation pool, an intertidal zone simulation pool, a supratidal zone simulation pool and a two-way water flow adjustment control box, where an impervious partition is provided between the water supply pool and the water level adjustment pool; a connecting pipe is provided at a lower part of the impervious partition; a control valve is provided on the connecting pipe; porous polyvinyl chloride (PVC) partitions are respectively provided between the water level adjustment pool and the subtidal zone simulation pool, the subtidal zone simulation pool and the intertidal zone simulation pool, as well as the intertidal zone simulation pool and the supratidal zone simulation pool; an anti-blocking gravel layer is provided on an inner side of the subtidal zone simulation pool close to the water level adjustment pool; the water supply pool is provided with a drain pipe and a water inlet pipe; the drain pipe and the water inlet pipe are respectively provided thereon with a control valve; a side wall of the water level adjustment pool is provided with a water level scale; the subtidal zone simulation pool, the intertidal zone simulation pool and the supratidal zone simulation pool are respectively filled with soil; the water supply pool and the water level adjustment pool are connected by a water level adjustment water pipe; the water level adjustment water pipe is connected to a forward frequency conversion self-priming pump and a reverse frequency conversion self-priming pump through an electromagnetic flow control meter in the two-way water flow adjustment control box; the electromagnetic flow control meter, the forward frequency conversion self-priming pump and the reverse frequency conversion self-priming pump are connected to an intelligent time-controlled three-way controller through a power wire; the intelligent time-controlled three-way controller periodically and automatically controls the start and stop of the forward frequency conversion self-priming pump, the reverse frequency conversion self-priming pump and the electromagnetic flow control meter, respectively.

Further, a pore diameter of the porous PVC partition is 5 cm, and a center distance between two adjacent pores is 20 cm.

Further, a gravel diameter of the anti-blocking gravel layer is 6-8 cm, and a thickness of the gravel layer is 15 cm.

Further, a slope of a surface of the soil filled in the subtidal zone simulation pool, the intertidal zone simulation pool and the supratidal zone simulation pool is respectively 0.2%; a minimum thickness of the soil in the subtidal zone simulation pool is 120 cm, and a minimum thickness of the soil in the supratidal zone simulation pool is 180 cm; an average thickness difference of the soil filled in the subtidal zone simulation pool and the intertidal zone simulation pool, as well as in the intertidal zone simulation pool and the supratidal zone simulation pool is 30 cm.

The present disclosure provides a method for using the tidal simulation test device, including the following steps:

a: fixing the two-way water flow adjustment control box after assembly and debugging outside the water level adjustment pool, and placing the water level adjustment water pipe in the water supply pool and the water level adjustment pool respectively, where the water level adjustment water pipe is 10 cm from the bottom of the water supply pool and 135 cm from the bottom of the water level adjustment pool;

b: fixing the water level scale vertically on an inner side of the water level adjustment pool, so that a lower end of the scale is in contact with the bottom of the water level adjustment pool;

c: closing the control valve of the drain pipe, and opening all control valves between the water supply pool and the water level adjustment pool; opening the control valve of the water inlet pipe to inject 3% prepared seawater into the pool to a water level of 1.8 m, and keeping the water in the pool for 3 d; opening the control valve of the drain pipe to drain all the water in the simulation pool, and closing the control valve of the drain pipe;

d: filling sediment soil collected from a tidal flat into the subtidal zone simulation pool, the intertidal zone simulation pool and the supratidal zone simulation pool respectively, where a slope of a surface of the soil is 0.2%; the soil on the bottom of the subtidal zone simulation pool has a minimum thickness of 120 cm; the soil on the bottom of the intertidal zone simulation pool has a minimum thickness of 150 cm; the soil on the bottom of the supratidal zone simulation pool has a minimum thickness of 180 cm; placing a 15 cm thick anti-blocking gravel layer on an inner side of the subtidal zone simulation pool adjacent to the water level adjustment pool;

e: opening the control valve of the water inlet pipe to inject 3% prepared seawater into the pool to a water level of 135 cm (control water level 1); closing the control valve of the water inlet pipe and all control valves between the water supply pool and the water level adjustment pool;

f: setting start and stop time of the forward frequency conversion self-priming pump and the reverse frequency conversion self-priming pump on the intelligent time-controlled three-way controller according to a simulated tide type;

g: making the electromagnetic flow control meter always in a starting state, where an initial control flow of the electromagnetic flow control meter is obtained through calculation, and then verified and adjusted by an actual test; the initial control flow is specifically calculated as follows:

$$F=(V_1+V_2+V_3+V_4)/t;$$

$$V_1[a \times b \times (H_2-H_1)] \times pt;$$

$$V_2=[a \times b \times (H_2-H_1) \times 0.5] \times pt;$$

$$V_3=V_4=a \times b \times (H_2-H_1);$$

where, F represents a control flow of the electromagnetic flow meter, $cm^3/h$; $V_1$, $V_2$, $V_3$ and $V_4$ respectively represent an adjusted water volume of the supratidal zone simulation pool, the intertidal zone simulation pool, the subtidal zone simulation pool and the water level adjustment pool, $cm^3$; t represents a one-way flow control time, which is 12 h for a regular diurnal tide; a represents a width of a single simulation pool, 200 cm; b represents a length of a single simulation pool, 200 cm; $H_2$ represents a maximum control water level (control water level 2 in a figure), 165 cm; $H_1$ represents a minimum control water level (control water level 1 in a figure), 135 cm; Pt represents a porosity of the sediment soil in the simulation pool, %;

h: starting the forward frequency conversion self-priming pump by the intelligent time-controlled three-way controller, so that water flows from the water supply pool into the water level adjustment pool, and a water level in the subtidal zone simulation pool, the intertidal zone simulation pool and the supratidal zone simulation pool gradually rises; running the forward frequency conversion self-priming pump for 12 h, so that the water level in the simulation pool rises from 135 cm to 165 cm; stopping the forward frequency conversion self-priming pump, and starting the reverse frequency conversion self-priming pump by the intelligent time-controlled three-way controller, so that the water returns from the water level adjustment pool to the water supply pool, and the water level in the subtidal zone simulation pool, the intertidal zone simulation pool and supratidal zone simulation pool gradually drops; running the reverse frequency conversion self-priming pump for 12 h, so that the water level in the simulation pool drops from 165 cm to 135 cm; repeating this process so as to simulate reciprocation of the regular diurnal tide.

The present disclosure has the following beneficial effects. 1. The simulation device is located outdoors and is consistent with the external environmental conditions (temperature, light, atmospheric humidity, etc.), so that the test conditions are closer to the natural environment. 2. Each simulation pool has a large controllable area and depth. The large area realizes the simulation of the elemental biogeochemical process of a vegetation-soil-water system under the simulated tidal conditions, and the large depth makes the water level in the simulation process adjustable. 3. The soil filled in the subtidal zone simulation pool, the intertidal zone simulation pool and the supratidal zone simulation pool is original soil collected from a subtidal zone, an intertidal zone and a supratidal zone of the Yellow River Delta. The soil is kept consistent with that in different parts of the coastal area, and the slope of the soil is designed to be 0.2%, which is close to the natural slope of the Yellow River Delta, making the simulation test results highly reliable. 4. The electromagnetic flow control meter accurately controls the flow to ensure the accuracy of the simulated tide level. 5. The intelligent time-controlled three-way controller accurately and automatically controls the start and stop time of the forward frequency conversion self-priming pump and the reverse frequency conversion self-priming pump, so as to achieve precise control of the fluctuation cycle of the simulated tide. 6. The intelligent time-controlled three-way controller and the electromagnetic flow control meter are adjusted according to the actual requirements of the simulated tide types so as to realize the simulation of multiple tide types. The present disclosure greatly saves the cost of field research, effectively eliminates the interference of field environmental factors and the danger of field operations, and improves the credibility and efficiency of tidal simulation research.

DETAILED DESCRIPTION

For better understanding and implementation of the present disclosure, the present disclosure is described in detail below with reference to the accompanying drawings and specific embodiments.

Figure 1:
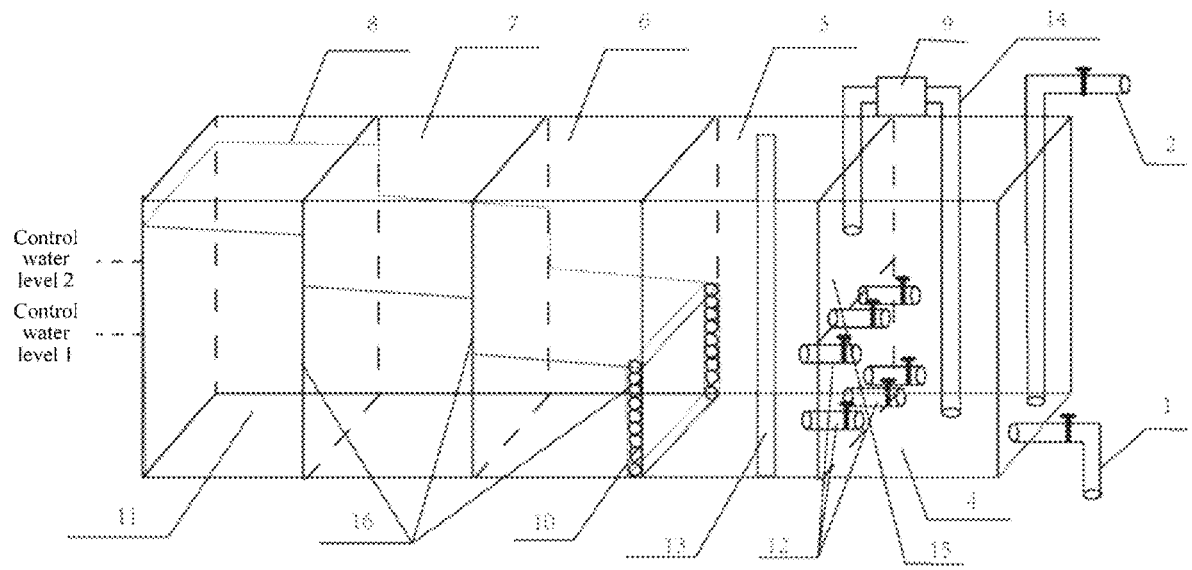
FIG. 1 is a structural view of the present disclosure.
Figure 2:
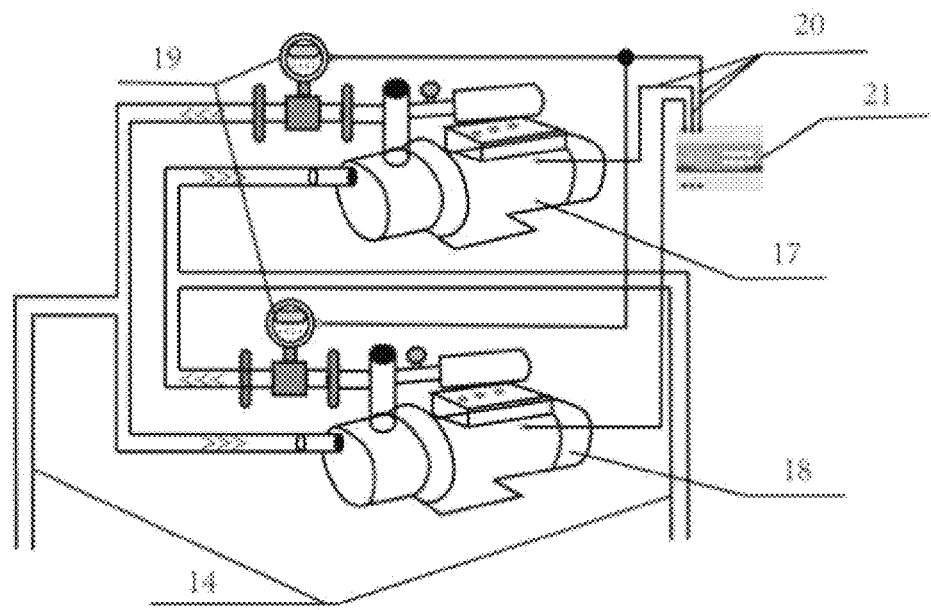
FIG. 2 is a structural view of a two-way water flow adjustment control box according to the present disclosure.

As shown in FIGS. 1 and 2, a tidal simulation test device includes a water supply pool 4, a water level adjustment pool 5, a subtidal zone simulation pool 6, an intertidal zone simulation pool 7 and a supratidal zone simulation pool 8. The length×width×height of the water supply pool 4, the water level adjustment pool 5, the subtidal zone simulation pool 6, the intertidal zone simulation pool 7 and the supratidal zone simulation pool 8 are 2 m×2 m×2 m respectively, and the bottom and side walls of the pool are waterproofed. An impervious partition 15 is provided between the water supply pool 4 and the water level adjustment pool 5. A connecting pipe 12 is provided at a lower part of the impervious partition 15. A control valve is provided on the connecting pipe 12. Porous polyvinyl chloride (PVC) partitions 16 are respectively provided between the water level adjustment pool 5 and the subtidal zone simulation pool 6, the subtidal zone simulation pool 6 and the intertidal zone simulation pool 7, as well as the intertidal zone simulation pool 7 and the supratidal zone simulation pool 8. A pore diameter of the porous PVC partition 16 is 5 cm, and a center distance between two adjacent pores is 20 cm. An anti-blocking gravel layer 10 is provided on an inner side of the subtidal zone simulation pool 6 close to the water level adjustment pool 5. A gravel diameter of the anti-blocking gravel layer 10 is 6-8 cm, and a thickness of the gravel layer is 15 cm. The water supply pool 4 is provided with a drain pipe 1 and a water inlet pipe 2. The drain pipe 1 and the water inlet pipe 2 are respectively provided thereon with a control valve. A side wall of the water level adjustment pool 5 is provided with a water level scale 13. The subtidal zone simulation pool 6, the intertidal zone simulation pool 7 and the supratidal zone simulation pool 8 are respectively filled with soil 11. The soil 11 was original soil collected from a subtidal zone, an intertidal zone and a supratidal zone of the Yellow River Delta. A slope of a surface of the soil 11 filled in the subtidal zone simulation pool 6, the intertidal zone simulation pool 7 and the supratidal zone simulation pool 8 is respectively 0.2%. A minimum thickness of the soil 11 in the subtidal zone simulation pool 6 is 120 cm, and a minimum thickness of the soil 11 in the supratidal zone simulation pool 8 is 180 cm. An average thickness difference of the soil 11 filled in the subtidal zone simulation pool 6 and the intertidal zone simulation pool 7, as well as in the intertidal zone simulation pool 7 and the supratidal zone simulation pool 8 is 30 cm. The water supply pool 4 and the water level adjustment pool 5 are connected by a water level adjustment water pipe 14. The water level adjustment water pipe 14 is connected to a forward frequency conversion self-priming pump 17 and a reverse frequency conversion self-priming pump 18 through an electromagnetic flow control meter 19 in a two-way water flow adjustment control box 9. The electromagnetic flow control meter 19 has an accuracy of 0.01 m³/h. The forward frequency conversion self-priming pump 17 and the reverse frequency conversion self-priming pump 18 have a maximum flow of 3.40 m³/h. The electromagnetic flow control meter 19, the forward frequency conversion self-priming pump 17 and the reverse frequency conversion self-priming pump 18 are connected to an intelligent time-controlled three-way controller 21 through a power wire 20. The intelligent time-controlled three-way controller 21 periodically and automatically controls the start and stop of the forward frequency conversion self-priming pump 17, the reverse frequency conversion self-priming pump 18 and the electromagnetic flow control meter 19, respectively.

A method for using the tidal simulation test device includes the following steps:

a: Fix the two-way water flow adjustment control box after assembly and debugging outside the water level adjustment pool, and place the water level adjustment water pipe in the water supply pool and the water level adjustment pool respectively, where the water level adjustment water pipe is 10 cm from the bottom of the water supply pool and 135 cm from the bottom of the water level adjustment pool.

b: Fix the water level scale vertically on an inner side of the water level adjustment pool, so that a lower end of the scale is in contact with the bottom of the water level adjustment pool.

c: Close the control valve of the drain pipe, and open all control valves between the water supply pool and the water level adjustment pool; open the control valve of the water inlet pipe to inject 3% prepared seawater into the pool to a water level of 1.8 m, and keep the water in the pool for 3 d; open the control valve of the drain pipe to drain all the water in the simulation pool, and close the control valve of the drain pipe.

d: Fill sediment soil collected from a tidal flat into the subtidal zone simulation pool, the intertidal zone simulation pool and the supratidal zone simulation pool respectively, where a slope of a surface of the soil is 0.2%; the soil on the bottom of the subtidal zone simulation pool has a minimum thickness of 120 cm; the soil on the bottom of the intertidal zone simulation pool has a minimum thickness of 150 cm; the soil on the bottom of the supratidal zone simulation pool has a minimum thickness of 180 cm; place a 15 cm thick anti-blocking gravel layer on an inner side of the subtidal zone simulation pool adjacent to the water level adjustment pool.

e: Open the control valve of the water inlet pipe to inject 3% prepared seawater into the pool to a water level of 135 cm (control water level 1); close the control valve of the water inlet pipe and all control valves between the water supply pool and the water level adjustment pool.

f: Set start and stop time of the forward frequency conversion self-priming pump and the reverse frequency conversion self-priming pump on the intelligent time-controlled three-way controller according to a simulated tide type. Taking the simulation of a regular diurnal tide as an example, the intelligent time-controlled three-way controller adjusts the start and stop time of the forward frequency conversion self-priming pump to 12:00-24:00 every day, and adjusts the start and stop time of the reverse frequency conversion self-priming pump to 00:00-12:00 every day.

g: Make the electromagnetic flow control meter always in a starting state, where an initial control flow of the electromagnetic flow control meter is obtained through calculation, and then verified and adjusted by an actual test; the initial control flow is specifically calculated as follows:

$$F=(V_1+V_2+V_3+V_4)/t;$$

$$V_1=[a \times b \times (H_2-H_1)] \times pt;$$

$$V_2=[a \times b \times (H_2-H_1) \times 0.5] \times pt;$$

$$V_3=V_4=a \times b \times (H_2-H_1)$$

where, F represents a control flow of the electromagnetic flow meter, cm³/h; $V_1$, $V_2$, $V_3$ and $V_4$ respectively represent an adjusted water volume of the supratidal zone simulation pool, the intertidal zone simulation pool, the subtidal zone simulation pool and the water level adjustment pool, cm³; t represents a one-way flow control time, which is 12 h for a regular diurnal tide; a represents a width of a single simulation pool, 200 cm; b represents a length of a single simulation pool, 200 cm; $H_2$ represents a maximum control water level (control water level 2 in a figure), 165 cm; $H_1$ represents a minimum control water level (control water level 1 in a figure), 135 cm; Pt represents a porosity of the sediment soil in the simulation pool, %.

h: Start the forward frequency conversion self-priming pump by the intelligent time-controlled three-way controller, so that water flows from the water supply pool into the water level adjustment pool, and a water level in the subtidal zone simulation pool, the intertidal zone simulation pool and the supratidal zone simulation pool gradually rises; run the forward frequency conversion self-priming pump for 12 h, so that the water level in the simulation pool rises from 135 cm to 165 cm; stop the forward frequency conversion self-priming pump, and start the reverse frequency conversion self-priming pump by the intelligent time-controlled three-way controller, so that the water returns from the water level adjustment pool to the water supply pool, and the water level in the subtidal zone simulation pool, the intertidal zone simulation pool and supratidal zone simulation pool gradually drops; run the reverse frequency conversion self-priming pump for 12 h, so that the water level in the simulation pool drops from 165 cm to 135 cm; repeat this process so as to simulate reciprocation of the regular diurnal tide.

It should be understood that all technical features not elaborated in this specification belong to the prior art. The specific implementations of the present disclosure are described above with reference to the accompanying drawings, but the present disclosure is not limited thereto. The above specific implementations are merely illustrative and not restrictive. Those of ordinary skill in the art may make several modifications to the present disclosure without departing from the purpose of the present disclosure and the scope of protection of the claims, but these modifications should all fall within the protection scope of the present disclosure Moreover, unless otherwise stated any numerical measurements/dimensions can be taken as approximate and subject to variation—for example (but not limited to), varying by 5% from the stated value.

What is claimed is:

1. A tidal simulation test device, comprising a water supply pool, a water level adjustment pool, a subtidal zone simulation pool, an intertidal zone simulation pool, a supratidal zone simulation pool and a two-way water flow adjustment control box, wherein an impervious partition is provided between the water supply pool and the water level adjustment pool; a connecting pipe is provided at a lower part of the impervious partition; a control valve is provided on the connecting pipe; porous polyvinyl chloride (PVC) partitions are respectively provided between the water level adjustment pool and the subtidal zone simulation pool, the subtidal zone simulation pool and the intertidal zone simulation pool, as well as the intertidal zone simulation pool and the supratidal zone simulation pool; an anti-blocking gravel layer is provided on an inner side of the subtidal zone simulation pool close to the water level adjustment pool; the water supply pool is provided with a drain pipe and a water inlet pipe; the drain pipe and the water inlet pipe are respectively provided thereon with a control valve; a side wall of the water level adjustment pool is provided with a water level scale; the subtidal zone simulation pool, the intertidal zone simulation pool and the supratidal zone simulation pool are respectively filled with soil; the water supply pool and the water level adjustment pool are connected by a water level adjustment water pipe; the water level adjustment water pipe is connected to a forward frequency conversion self-priming pump and a reverse frequency conversion self-priming pump through an electromagnetic flow control meter in the two-way water flow adjustment control box; the electromagnetic flow control meter, the forward frequency conversion self-priming pump and the reverse frequency conversion self-priming pump are connected to an intelligent time-controlled three-way controller through a power wire; the intelligent time-controlled three-way controller periodically and automatically controls the start and stop of the forward frequency conversion self-priming pump, the reverse frequency conversion self-priming pump and the electromagnetic flow control meter, respectively.

2. The tidal simulation test device according to claim 1, wherein a pore diameter of the porous PVC partition is approximately 5 cm, and a center distance between two adjacent pores is approximately 20 cm.

3. The tidal simulation test device according to claim 1, wherein a gravel diameter of the anti-blocking gravel layer is approximately 6-8 cm, and a thickness of the gravel layer is approximately 15 cm.

4. The tidal simulation test device according to claim 1, wherein a slope of a surface of the soil filled in the subtidal zone simulation pool, the intertidal zone simulation pool and the supratidal zone simulation pool is respectively approximately 0.2%; a minimum thickness of the soil in the subtidal zone simulation pool is approximately 120 cm, and a minimum thickness of the soil in the supratidal zone simulation pool is approximately 180 cm; an average thickness difference of the soil filled in the subtidal zone simulation pool and the intertidal zone simulation pool and the intertidal zone simulation pool and the supratidal zone simulation pool is approximately 30 cm.

5. A method for using the tidal simulation test device according to claim 1, comprising the following steps:
   a: fixing the two-way water flow adjustment control box after assembly and debugging outside the water level adjustment pool, and placing the water level adjustment water pipe in the water supply pool and the water level adjustment pool respectively, wherein the water level adjustment water pipe is approximately 10 cm from the bottom of the water supply pool and approximately 135 cm (control level 1) from the bottom of the water level adjustment pool;
   b: fixing the water level scale vertically on an inner side of the water level adjustment pool, so that a lower end of the scale is in contact with the bottom of the water level adjustment pool;
   c: closing the control valve of the drain pipe, and opening all control valves between the water supply pool and the water level adjustment pool; opening the control valve of the water inlet pipe to inject 3% prepared seawater into the pool to a water level of approximately 1.8 m, and keeping the water in the pool for 3 d; opening the control valve of the drain pipe to drain all the water in the simulation pool, and closing the control valve of the drain pipe;
   d: filling sediment soil collected from a tidal flat into the subtidal zone simulation pool, the intertidal zone simulation pool and the supratidal zone simulation pool respectively, wherein a slope of a surface of the soil is 0.2%; the soil on the bottom of the subtidal zone simulation pool has a minimum thickness of approximately 120 cm; the soil on the bottom of the intertidal zone simulation pool has a minimum thickness of approximately 150 cm; the soil on the bottom of the supratidal zone simulation pool has a minimum thickness of approximately 180 cm; placing an approximately 15 cm thick anti-blocking gravel layer on an inner side of the subtidal zone simulation pool adjacent to the water level adjustment pool;
   e: opening the control valve of the water inlet pipe to inject approximately 3% prepared seawater into the pool to a water level of approximately 135 cm; closing the control valve of the water inlet pipe and all control valves between the water supply pool and the water level adjustment pool;
   f: setting start and stop time of the forward frequency conversion self-priming pump and the reverse frequency conversion self-priming pump on the intelligent time-controlled three-way controller according to a simulated tide type;
   g: making the electromagnetic flow control meter always in a starting state, wherein an initial control flow of the electromagnetic flow control meter is obtained through calculation, and then verified and adjusted by an actual test; the initial control flow is specifically calculated as follows:

$$F=(V_1+V_2+V_3+V_4)/t;$$

$$V_1[a \times b \times (H_2-H_1)] \times pt;$$

$$V_2=[a \times b \times (H_2-H_1) \times 0.5] \times pt;$$

$$V_3=V_4=a \times b \times (H_2-H_1);$$

wherein, F represents a control flow of the electromagnetic flow meter, $cm^3/h$; $V_1$, $V_2$, $V_3$ and $V_4$ respectively represent an adjusted water volume of the supratidal zone simulation pool, the intertidal zone simulation pool, the subtidal zone simulation pool and the water level adjustment pool, $cm^3$; t represents a one-way flow control time, comprising approximately 12 h for a regular diurnal tide; a represents a width of a single simulation pool, approximately 200 cm; b represents a length of a single simulation pool, 200 cm; $H_2$ represents a maximum control water level (control water level 2 in a figure), approximately 165 cm; $H_1$ represents a minimum control water level (control water level 1 in a figure), approximately 135 cm; Pt represents a porosity of the sediment soil in the simulation pool, %;

h: starting the forward frequency conversion self-priming pump by the intelligent time-controlled three-way controller, so that water flows from the water supply pool into the water level adjustment pool, and a water level in the subtidal zone simulation pool, the intertidal zone simulation pool and the supratidal zone simulation pool gradually rises; running the forward frequency conversion self-priming pump for approximately 12 h, so that the water level in the simulation pool rises from approximately 135 cm to 165 cm; stopping the forward frequency conversion self-priming pump, and starting the reverse frequency conversion self-priming pump by the intelligent time-controlled three-way controller, so that the water returns from the water level adjustment pool to the water supply pool, and the water level in the subtidal zone simulation pool, the intertidal zone simulation pool and supratidal zone simulation pool gradually drops; running the reverse frequency conversion self-priming pump for approximately 12 h, so that the water level in the simulation pool drops from approximately 165 cm to 135 cm; repeating this process so as to simulate reciprocation of the regular diurnal tide.

6. The method for using the tidal simulation test device according to claim 5, wherein a pore diameter of the porous PVC partition is approximately 5 cm, and a center distance between two adjacent pores is approximately 20 cm.

7. The method for using the tidal simulation test device according to claim 5, wherein a gravel diameter of the anti-blocking gravel layer is approximately 6-8 cm, and a thickness of the gravel layer is approximately 15 cm.

8. The method for using the tidal simulation test device according to claim 5, wherein a slope of a surface of the soil filled in the subtidal zone simulation pool, the intertidal zone simulation pool and the supratidal zone simulation pool is respectively 0.2%; a minimum thickness of the soil in the subtidal zone simulation pool is 120 cm, and a minimum thickness of the soil in the supratidal zone simulation pool is 180 cm; an average thickness difference of the soil filled in the subtidal zone simulation pool and the intertidal zone simulation pool, as well as in the intertidal zone simulation pool and the supratidal zone simulation pool is 30 cm.

* * * * *